United States Patent
Yu et al.

(10) Patent No.: US 9,147,009 B2
(45) Date of Patent: Sep. 29, 2015

(54) METHOD OF TEMPORAL BIPARTITE PROJECTION

(71) Applicant: National Taiwan University, Taipei (TW)

(72) Inventors: Sheau-Harn Yu, Taipei (TW); Wanjiun Liao, Taipei (TW); Cheng-Shang Chang, Hsinchu (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 125 days.

(21) Appl. No.: 13/765,492

(22) Filed: Feb. 12, 2013

(65) Prior Publication Data

US 2014/0229510 A1 Aug. 14, 2014

(51) Int. Cl.
G06F 17/30 (2006.01)
(52) U.S. Cl.
CPC .................. *G06F 17/30958* (2013.01)
(58) Field of Classification Search
None
See application file for complete search history.

(56) References Cited

PUBLICATIONS

Sheau-Harn, et al., "Temporal Bipartite Projection and Link Prediction Problem for Social Networks", Jul. 2012, National Taiwan University.*

* cited by examiner

*Primary Examiner* — Alex Gofman
*Assistant Examiner* — Umar Mian
(74) *Attorney, Agent, or Firm* — Huffman Law Group, PC

(57) ABSTRACT

The present disclosure relates, according to some embodiments, to a method of temporal bipartite projection for users and objects and a method of link prediction for an unhappened event. The method of the temporal bipartite projection comprises making a sequence of user-object weighted bipartite networks with the user-object weights, identifying the transitions for each user from a first object at a first time to a second object at a second time, assigning the transition weights corresponding to the transitions according to a predetermined rule, summing the transition weights for all users between two objects to obtain the transition tendencies, and constructing a temporal projection graph with the transition tendencies. The method of link prediction comprises constructing the temporal projection graph, identifying the potential transitions for the unhappened event at a target time, assigning the potential transition weights according to a second predetermined rule, summing the potential transition weights to obtain the scores, and ranking the scores of the link prediction.

11 Claims, 7 Drawing Sheets

$$G^1 = \begin{bmatrix} 1 & 1 & 0 \\ 2 & 0 & 0 \end{bmatrix} \quad G^2 = \begin{bmatrix} 0 & 2 & 0 \\ 0 & 0 & 0 \end{bmatrix} \quad G^3 = \begin{bmatrix} 0 & 1 & 1 \\ 1 & 0 & 1 \end{bmatrix}$$

$R_a = (1, 1, 1, 2, 2)$    $R_b = (1, 1, 1, 2, 3)$    $R_c = (1, 1, 1, 3, 3)$ $R_d = (1, 2, 1, 2, 2)$    $R_e = (1, 2, 1, 2, 3)$    $R_f = (1, 2, 1, 3, 3)$ $R_g = (1, 2, 2, 2, 3)$    $R_h = (1, 2, 2, 3, 3)$    $R_i = (2, 1, 1, 1, 3)$ $R_k = (1, 2, 2, 3, 3)$    $\hat{G} = \begin{bmatrix} 0.64 & 0.32 & 0.78 \\ 0 & 1.12 & 0.94 \end{bmatrix}$

METHOD OF TEMPORAL BIPARTITE PROJECTION

FIELD OF THE DISCLOSURE

The present disclosure relates, according to some embodiments, to methods of temporal bipartite projection. For example, some embodiments of the present disclosure provides for methods of temporal bipartite projection to generate temporal projection graphs that characterize the transition tendencies among objects.

BACKGROUND OF THE DISCLOSURE

Online social networks are becoming increasingly popular and may be very dynamic and engaging for users. Many activities may occur in such online social networks: people may interact with one another, express opinions, share files, and view or purchase products or services from all over the world. Online social networks may be modeled by sequences of bipartite networks indexed in time. Bipartite networks may use two types of nodes: users and objects. Object nodes may represent things such as products, files, articles, and author-conference datasets. Such bipartite networks are called user-object networks.

A traditional method for bipartite projection projects a bipartite graph into a unipartite graph of one type of node from the original bipartite graph. For user-object networks, the traditional method projects the user-object graph into either a user graph or an object graph. FIG. 1 depicts a schematic diagram of a traditional bipartite projection method. As seen in FIG. 1, a user-object bipartite network $G_{UO}$ has user nodes $U=\{u_1, u_2, \ldots u_7\}$ and object nodes $O=\{o_1, o_2, \ldots o_5\}$. The user-object bipartite network $G_{UO}$ is projected into a user network $G_U$ and an object network $G_O$. Accordingly, if two nodes in the user-object graph have common neighbors, projected networks $G_U$ and $G_O$ may be established through a user projection $P_U$ and an object projection $P_O$, respectively.

The traditional bipartite projection method maps the unweighted user-object bipartite network $G_{UO}$ to either the user network $G_U$ or the object network $G_O$. Accordingly, one has to collapse all the temporal bipartite networks into a single network in order to make use of such a method. This results in the loss of valuable temporal information and individual user history. Without the temporal information, it may be very difficult to find out whether an object is the substitute of another object.

Therefore, there is a need for a method of temporal bipartite projection that takes into account temporal information.

SUMMARY OF THE DISCLOSURE

The present disclosure describes methods of temporal bipartite projection and application methods thereof. The present disclosure relates, in some embodiments, to methods of temporal bipartite projection that generate temporal projection graphs by mapping sequences of weighted bipartite networks to weighted directed projected object graphs by assigning corresponding transition tendencies as its edge weights.

In some embodiments, a method of temporal bipartite projection for users and objects is provided. The method comprises receiving a user-object dataset, wherein the user-object dataset comprises a set of users, a set of objects, and a set of times for which the events between the users and the objects occur at; making a sequence of user-object weighted bipartite networks $\{G^t, t=1, 2, \ldots, T\}$ with a set of user-object weights between each pair of an $n^{th}$ user and a $m^{th}$ object at a time t by data processing to the user-object dataset; identifying a set of transitions $R(n, i, t_1, j, t_2)$ for the $n^{th}$ user from a $i^{th}$ object at a first time $t_1$ to a $j^{th}$ object at a second time $t_2$ according to the user-object weighted bipartite networks $G^t$, wherein $t_2 > t_1$; assigning a set of transition weights $w(n, i, t_1, j, t_2)$ corresponding to the transitions $R(n, i, t_1, j, t_2)$ according to a predetermined rule; summing the transition weights $w(n, i, t_1, j, t_2)$ for all users to obtain a set of transition tendencies $\hat{g}_{i,j}$ from the $i^{th}$ object to the $j^{th}$ object; and constructing a temporal projection graph $\hat{G}$ for all objects with the transition tendencies $\hat{g}_{i,j}$.

In some embodiments, a method of generating a popularity index for objects is provided. The method comprises constructing the temporal projection graph $\hat{G}$ in an adjacency matrix form; estimating a first accumulated number of non-zero entries in the $i^{th}$ column of the temporal projection graph $\hat{G}$ as an indegree $d_{in}(i)$ of the $i^{th}$ object $O_i$ and a second accumulated number of non-zero entries in the $i^{th}$ row of the temporal projection graph $\hat{G}$ as an outdegree $d_{out}(i)$ of the $i^{th}$ object $O_i$; and calculating a ratio of the indegree $d_{in}(i)$ to the sum the indegree $d_{in}(i)$ and the outdegree $d_{out}(i)$ as the popularity index Popul(i) of the $i^{th}$ object $O_i$.

In some embodiments, a method of estimating a transition probability for objects is provided. The method comprises constructing a temporal projection graph $\hat{G}$ in an adjacency matrix form; summing all entries in the $i^{th}$ column of the temporal projection graph $\hat{G}$; and calculating a ratio of the transition tendency $\hat{g}_{i,j}$ to the sum of all entries in the $i^{th}$ column of the temporal projection graph $\hat{G}$ as the transition probability $p_{i,j}$ for all users from the $i^{th}$ object $O_i$ to the $j^{th}$ object $O_j$.

In some embodiments, a method of link prediction for an unhappened event between the users and objects. The method comprises constructing the temporal projection graph $\hat{G}$ in an adjacency matrix form; identifying a set of potential transitions $R_p(n, i, t_3, j, T+1)$ for the unhappened events of the $n^{th}$ user from the $i^{th}$ object $O_i$ at a third time $t_3$ to the $j^{th}$ object $O_j$ at a target time $T+1$, wherein $1 \leq t_3 \leq T$, and $1 \leq i, j \leq M$ assigning a set of potential transition weights $w_p(n, i, t_3, j, T+1)$ corresponding to the potential transitions $R_p(n, i, t_3, j, T+1)$ according to a second predetermined rule; summing the potential transition weights $w_p(n, i, t_3, j, T+1)$ for the $n^{th}$ user and the $j^{th}$ object $O_j$ to obtain a set of scores $$\text{Score}(n, j) = \sum_{t_3=1}^{T} \sum_{i=1}^{M} w_p(n, i, t_3, j, T+1);$$

and ranking the scores Score(n,j) for the link prediction of the unhappened events of the $n^{th}$ user and the $j^{th}$ object $O_j$.

Therefore, the present disclosure provides for methods of temporal bipartite projection and application methods thereof that take into account the temporal information for identifying substitute relationships between two objects by assigning transition weights for the transitions. Accordingly, the transition tendencies obtained this way can be viewed as a social aggregated change of the preferences among all objects.

The foregoing is a summary and shall not be construed to limit the scope of the claims. The operations and devices disclosed herein may be implemented in a number of ways, and such changes and modifications may be made without departing from this disclosure and its broader aspects. Other aspects, inventive features, and advantages of the disclosure, as defined solely by the claims, are described in the non-limiting detailed description set forth below.

DETAILED DESCRIPTION OF EMBODIMENTS

Figure 1:
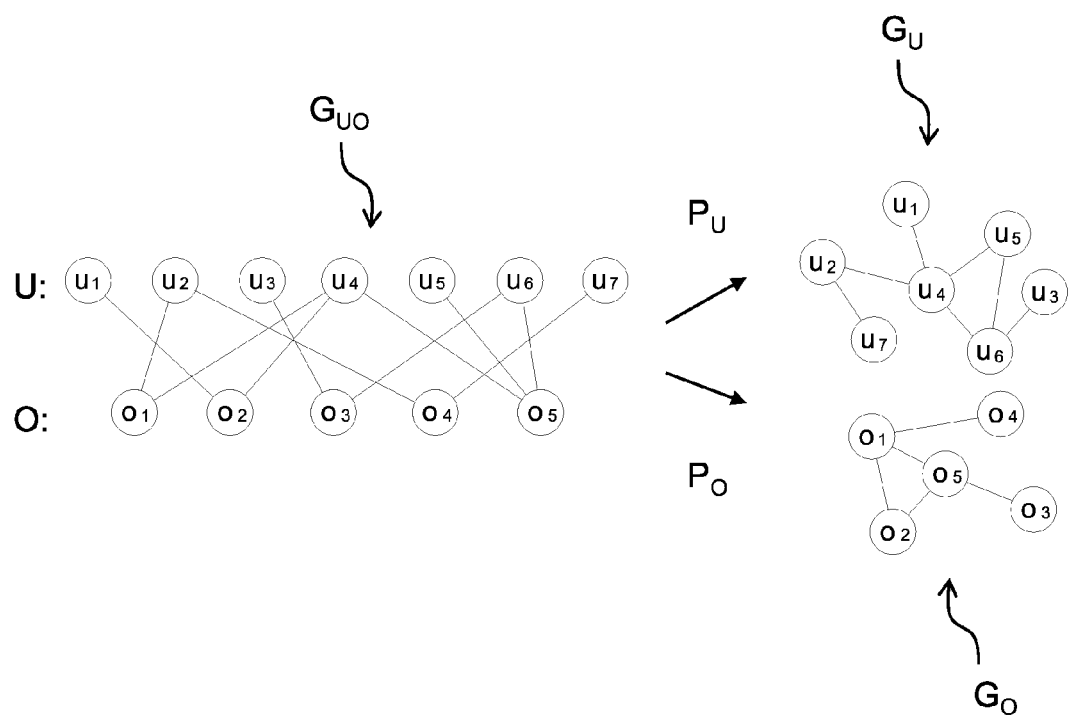
FIG. 1 illustrates a schematic diagram of a traditional bipartite projection.

Reference will be made to example embodiments illustrated in the accompanying drawings. Wherever possible, the same reference numbers are used in the drawings and the description to refer to the same or like parts.

Figures 2A, 2B:
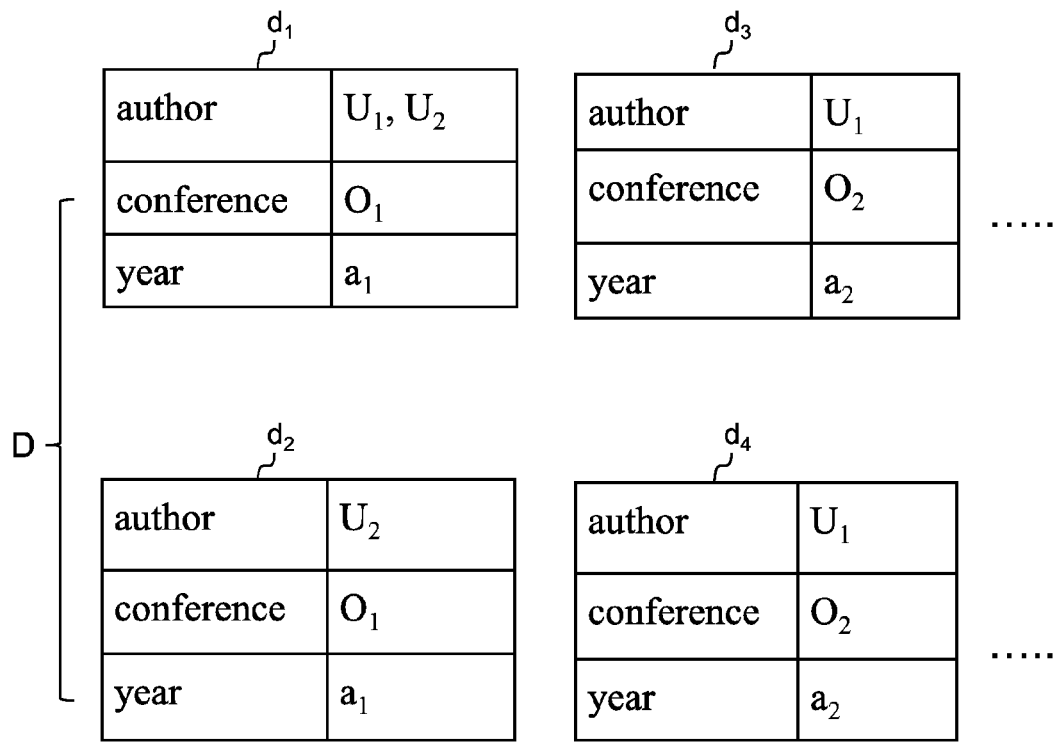
FIG. 2A illustrates an example of a user-object dataset for a method of temporal bipartite projection in accordance with one embodiment of the present disclosure.
FIG. 2B illustrates an example of a sequence of user-object weighted bipartite networks for a method of temporal bipartite projection in accordance with one embodiment of the present disclosure.
Figure 2C:
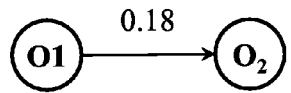
FIG. 2C illustrates an example of a set of transition weights and a temporal projection graph for a method of temporal bipartite projection in accordance with one embodiment of the present disclosure.
Figure 2C:
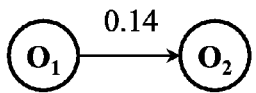
Figure 2C:
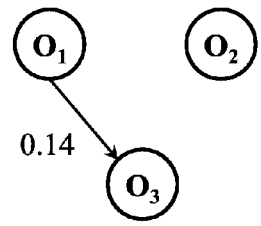
Figure 2C:
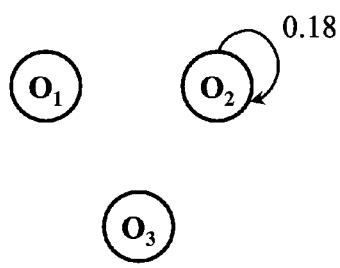
Figure 2C:
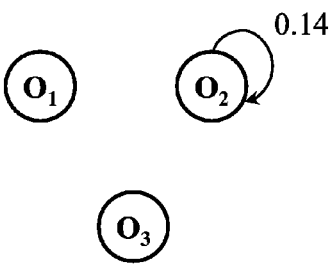
Figure 2C:
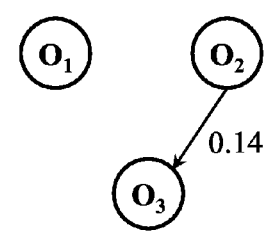
Figure 2C:
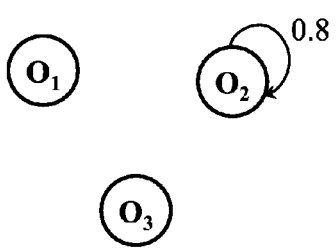
Figure 2C:
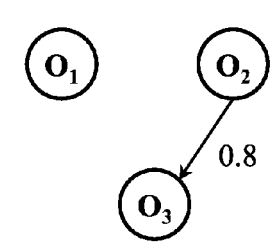
Figure 2C:
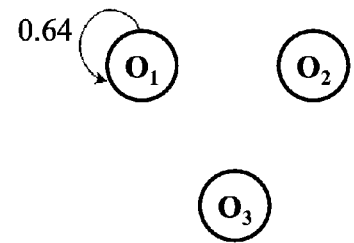
Figure 2C:
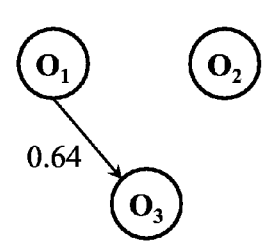
Figure 2C:
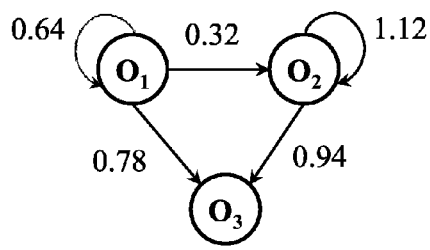
Figure 2D:
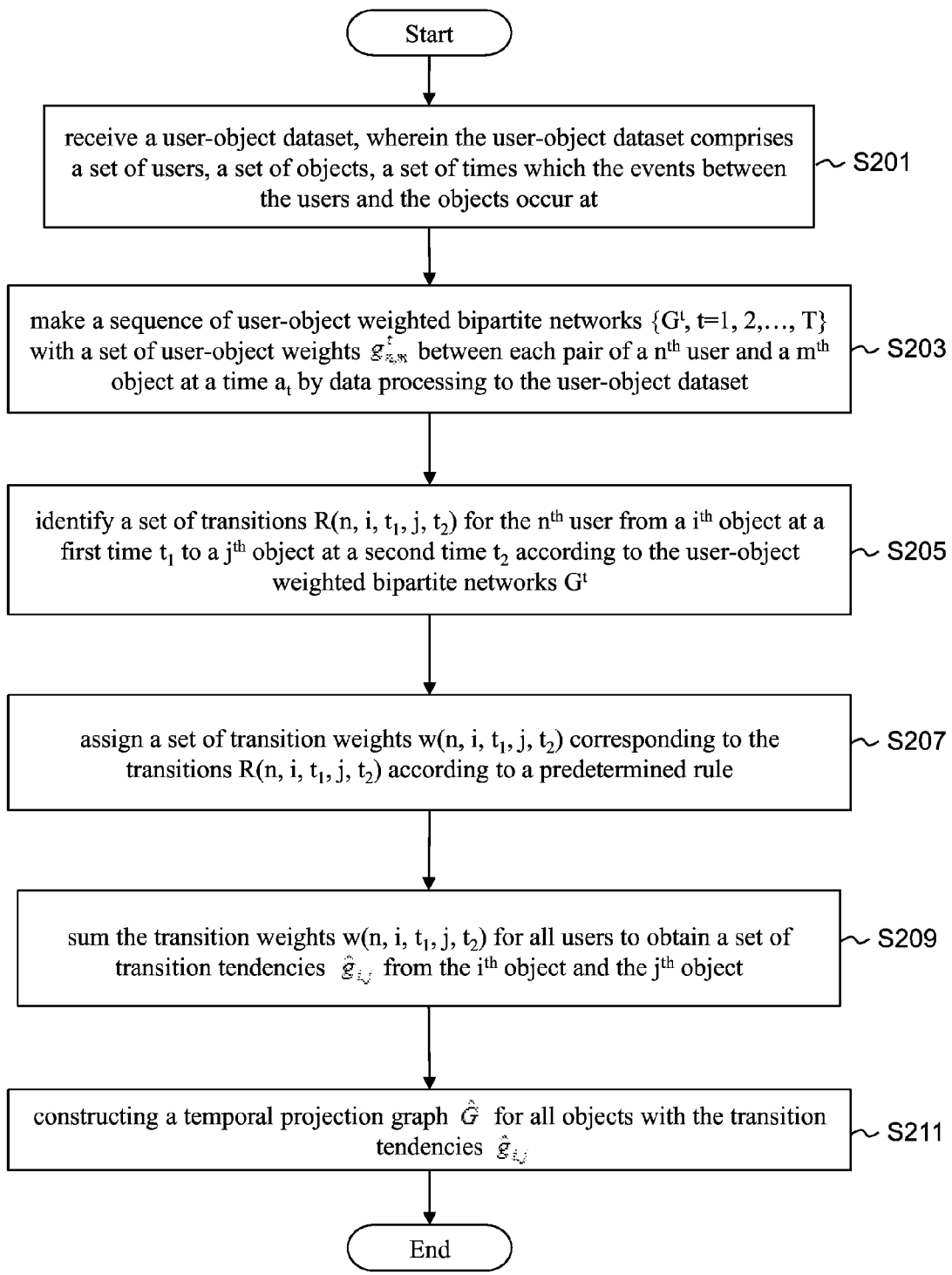
FIG. 2D illustrates a flow chart of a method of temporal bipartite projection in accordance with one embodiment of the present disclosure.

FIG. 2A illustrates an example of a user-object dataset for a method of temporal bipartite projection. FIG. 2B illustrates an example of a sequence of user-object weighted bipartite networks for a method of temporal bipartite projection. FIG. 2C illustrates an example of a set of transition weights and a temporal projection graph for a method of temporal bipartite projection. FIG. 2D illustrates a flow chart of a method of temporal bipartite projection in accordance with one embodiment of the present disclosure.

The present disclosure relates, in some embodiments, to a method of temporal bipartite projection. According to the method, first, a computer may receive a user-object dataset D comprising a plurality of data $d_1$-$d_4$, in which each data ($d_1$, $d_2$, $d_3$, or $d_4$) includes users $U_k$, objects $O_p$, and occurred times $a_t$ related between the users and the objects (S201). As shown in FIG. 2A, the method may take a conference dataset as an example for the user-object dataset D, takes the authors as the users $U_k$, takes the conferences as the objects $O_p$, and takes the publishing years as the occurred times $a_t$, where k=1, N; p=1, 2, . . . , M; and t=1, 2, . . . , T, where $a_T$ indicates a training period. One of ordinary skill in the art, having the benefit of the present disclosure, would appreciate that the users and objects are not limited to the authors and the conferences, other pairs of users and objects might be also applied.

Next, according to the method, the computer may operate a data processing to the user-object dataset D, such as classification by time, user, and object, to making a sequence of user-object weighted bipartite networks {$G^t$, t=1, 2, . . . , T} in an adjacency matrix form with a set of user-object weights $g_{n,m}^t$ as shown in FIG. 2B (S203). Each of the user-object weights $g_{n,m}^t$ in $n^{th}$ column and $m^{th}$ row of the user-object weighted bipartite networks $G^t$ indicates a weight (link times) between each pair of a $n^{th}$ user $U_n$ and a $m^{th}$ object $O_m$ at a time $a_t$. For example, the value of $g_{1,1}^1$ is 1 indicates that the first user $U_1$ had been submitted one journal to the first conference $O_1$ at time $a_1$, and the value of $g_{2,1}^1$ is 2 indicates the second author $U_2$ had been submitted two journals to the first conference $O_1$ at time $a_1$.

The computer may identify a set of transitions R(n, i, $t_1$, j, $t_2$) for each user $U_n$ from a $i^{th}$ object $O_i$ at a first time $t_1$ to a $j^{th}$ object $O_j$ at a second time $t_2$ according to the user-object weighted bipartite networks $G^t$, wherein 1≤n≤N, 1≤$t_1$≤$t_2$≤T, and 1≤i, j≤M (S205). As shown in FIG. 2C, the transition $R_a$(1, 1, 1, 2, 2) indicates that the first user $U_1$ contributed to the first object $O_1$ at time $a_1$, and then contributed to the second object $O_2$ at time $a_2$.

Then, according to the method, the computer may assign a set of transition weights w(n, i, $t_1$, j, $t_2$) for the transitions R(n, i, $t_1$, j, $t_2$) respectively according to a predetermined rule for obtaining transition tendencies between two objects (S207).

Then, according to the method, the computer may sum the transition weights w(n, i, $t_1$, j, $t_2$) for all users $U_k$ between two objects $O_i$, $O_j$, to obtain a set of transition tendencies $$\hat{g}_{i,j} = \sum_{n=1}^{N} \sum_{t_1=1}^{T-1} \sum_{t_2=t_1+1}^{T} w(n, i, t_1, j, t_2). \quad (S209)$$

Lastly, according to the method, the computer may construct a temporal projection graph $\hat{G}$ for all objects with the transition tendencies $\hat{g}_{i,j}$ (S211). More specifically, each of the transition tendencies $\hat{g}_{i,j}$ denotes the entry of the $i^{th}$ column and the $j^{th}$ row of the temporal projection graph $\hat{G}$ in an adjacency form.

In some embodiments, the predetermined rule comprises that each of the transition weights w(n, i, $t_1$, j, $t_2$) is increasing in the first time $t_1$ at which the transition R(n, i, $t_1$, j, $t_2$) occurs. For example, a recent transition should carry a larger transition weight than an obsolete transition. Therefore, the computer may identify a first weighting factor $\alpha_1$ ($t_1$) for each of the transition weights w(n, i, $t_1$, j, $t_2$) that is increasing in $t_1$.

In some embodiments, the predetermined rule comprises that each of the transition weights w(n, i, $t_1$, j, $t_2$) is increasing in the user-object weight $g_{n,i}^{t_1}$ between the $n^{th}$ user $U_n$ and the $i^{th}$ object $O_i$ at the first time $t_1$. For example, a transition with a larger user-object weight $g_{n,i1}^{t_1}$ between a user $U_n$ and an object $O_{i1}$ at a time $t_1$ should carry a larger transition weight than a transition with a smaller weight $g_{n,i2}^{t_1}$ between the same user and another object $O_{i2}$ at the same time $t_1$. Therefore, the computer may define a second weighting factor $\alpha_2$ ($g_{n,i}^{t_1}$) for each of the transition weights w(n, i, $t_1$, j, $t_2$) that is increasing in the user-object weight $g_{n,i}^{t_1}$.

In some embodiments, the predetermined rule comprises that each of the transition weights w(n, i, $t_1$, j, $t_2$) is decreasing in the duration ($t_2$-$t_1$) of the transition R(n, i, $t_1$, j, $t_2$). For example, a transition with a shorter time difference should carry a larger transition weight than a transition with a larger time difference. Therefore, the computer may define a third weighting factor $\alpha_3$ ($t_2$-$t_1$) for each of the transition weights w(n, i, $t_1$, j, $t_2$) that is decreasing in the duration ($t_2$-$t_1$) of the transition R(n, i, $t_1$, j, $t_2$).

In some embodiments, the predetermined rule comprises that the transition R(n, i, $t_1$, j, $t_2$) for each of the users $U_k$ should be normalized. Since each of the transition tendencies may be viewed as a social aggregated preference of the objects $O_p$, the assignment of the transition weights $w(n, i, t_1, j, t_2)$ should avoid one user $U_n$ dominating the social aggregated preference. For example, if a user $U_n$ has a transition $R(n, i, t_1, j, t_2)$ for a very small $t_1$, there may be many transitions for the user $U_n$ in a sequence of user-object weighted bipartite networks $G^t$. Therefore, the computer may define a fourth weighting factor $\alpha_4(n, t_1)$ for normalizing each of the transition weights $w(n, i, t_1, j, t_2)$ of each user $U_n$.

In some embodiments, the computer may use the simple product of these four weighting factors $\alpha_1, \alpha_2, \alpha_3, \alpha_4$ for the transition weights $w(n, i, t_1, j, t_2)$ to satisfy the following equation:

$$w(n,i,t_1,j,t_2) = \alpha_1(t_1) \times \alpha_2(g_{n,i}^{t_1}) \times \alpha_3(t_2 - t_1) \times \alpha_4(n, t_1) \quad (1)$$

To simplify the calculation, the computer may assume that the fourth weighting factor $\alpha_4(n, t_1)$ is determined by the second weighting factor $\alpha_2$ and the third weighting factor $\alpha_3$. Accordingly, the weighting factors satisfy the following equation:

$$\alpha_4(n, t_1) = \frac{1}{\left(\sum_{l=1}^{M} \alpha_2(g_{n,l}^{t_1})\right)\left(\sum_{s=t_1}^{T} I_n^s \times \alpha_3(t_2 - t_1)\right)} \quad (2)$$

In equation (2), the computer may assume that $I_n^t$ denotes an indicator variable for the event with positive user-object weight $g_{n,i}^t$. Accordingly, $I_n^t$ satisfies the following equation:

$$I_n^t = \begin{cases} 1, & \text{if } \sum_{j=1}^{M} g_{n,j}^t > 0 \\ 0, & \text{otherwise} \end{cases} \quad (3)$$

The transition weights $w(n, i, t_1, j, t_2)$ may further satisfy the following equation:

$$w(n, i, t_1, j, t_2) = \alpha_1(t_1) \times \frac{\alpha_2(g_{n,i}^{t_1})}{\sum_{l=1}^{m} \alpha_2(g_{n,l}^{t_1})} \times \frac{\alpha_3(t_2 - t_1)}{\sum_{s=t_1+1}^{T} I_n^s \times \alpha_3(s - t_1)} \quad (4)$$

Further, the computer may simplify the transition weights $w(n, i, t_1, j, t_2)$ by assuming that $\alpha_1(t) = \alpha_3(T-t) = \alpha(t)$ and $\alpha_2(g_{n,i}^{t_1}) = g_{n,i}^{t_1}$. Accordingly, the transition weights $w(n, i, t_1, j, t_2)$ satisfy the following equation:

$$w(n, i, t_1, j, t_2) = \alpha(t_1) \times \frac{g_{n,i}^{t_1}}{\sum_{l=1}^{M} g_{n,l}^{t_1}} \times \frac{\alpha(T - (t_2 - t_1))}{\sum_{s=t_1+1}^{T} I_n^s \times \alpha(T - (s - t_1))} \quad (5)$$

Therefore, the transition tendencies $\hat{g}_{i,j}$ may satisfy the following equation:

$$\hat{g}_{i,j} = \sum_{n=1}^{N} \sum_{t_1=1}^{T-1} \sum_{t_2=t_1+1}^{T} \left( \alpha(t_1) \times \right. \quad (6)$$

$$\left. \frac{g_{n,i}^{t_1}}{\sum_{l=1}^{M} g_{n,l}^{t_1}} \times I_{n,j}^{t_2} \times \frac{\alpha(T - (t_2 - t_1))}{\sum_{s=t_1+1}^{T} I_n^s \times \alpha(T - (s - t_1))} \right)$$

In equation (6), the computer may assume that $I_{n,j}^{t_2} = 1$ if $g_{n,j}^{t_2} > 0$, and $I_{n,j}^{t_2} = 0$ otherwise. Note that only if there is a transition $R(n, i, t_1, j, t_2)$, $g_{n,i}^{t_1} > 0$, and $I_{n,j}^{t_2} = 1$.

In some embodiments, the computer may assume that $\alpha(t) = (0.8)^{T-t}$. To take the transition tendency $\hat{g}_{1,2}$ of the first user $U_1$ from the first object $O_1$ to the second object $O_2$ for example, $\hat{g}_{1,2}$ may be calculated through equation (6) according to the transition $R_a(1,1, 1, 2, 2)$, transition $R_b(1, 1, 1, 2, 3)$ and the user-object weight $g_{1,1}^1$ thereof with the following equation:

$$\hat{g}_{1,2} = 0.8^{3-1} \frac{1}{1+1} \frac{0.8^{3-(3-1)}}{0.8 + 0.8^2} + 0.8^{3-1} \frac{1}{1+1} \frac{0.8^{3-(3-2)}}{0.8 + 0.8^2}$$

$$= 0.18 + 0.14$$

$$= 0.32$$

Accordingly, the temporal projection graph $\hat{G}$ in an adjacency form may be constructed as shown in FIG. 2C and stored in the memory of the computer.

Figure 3:
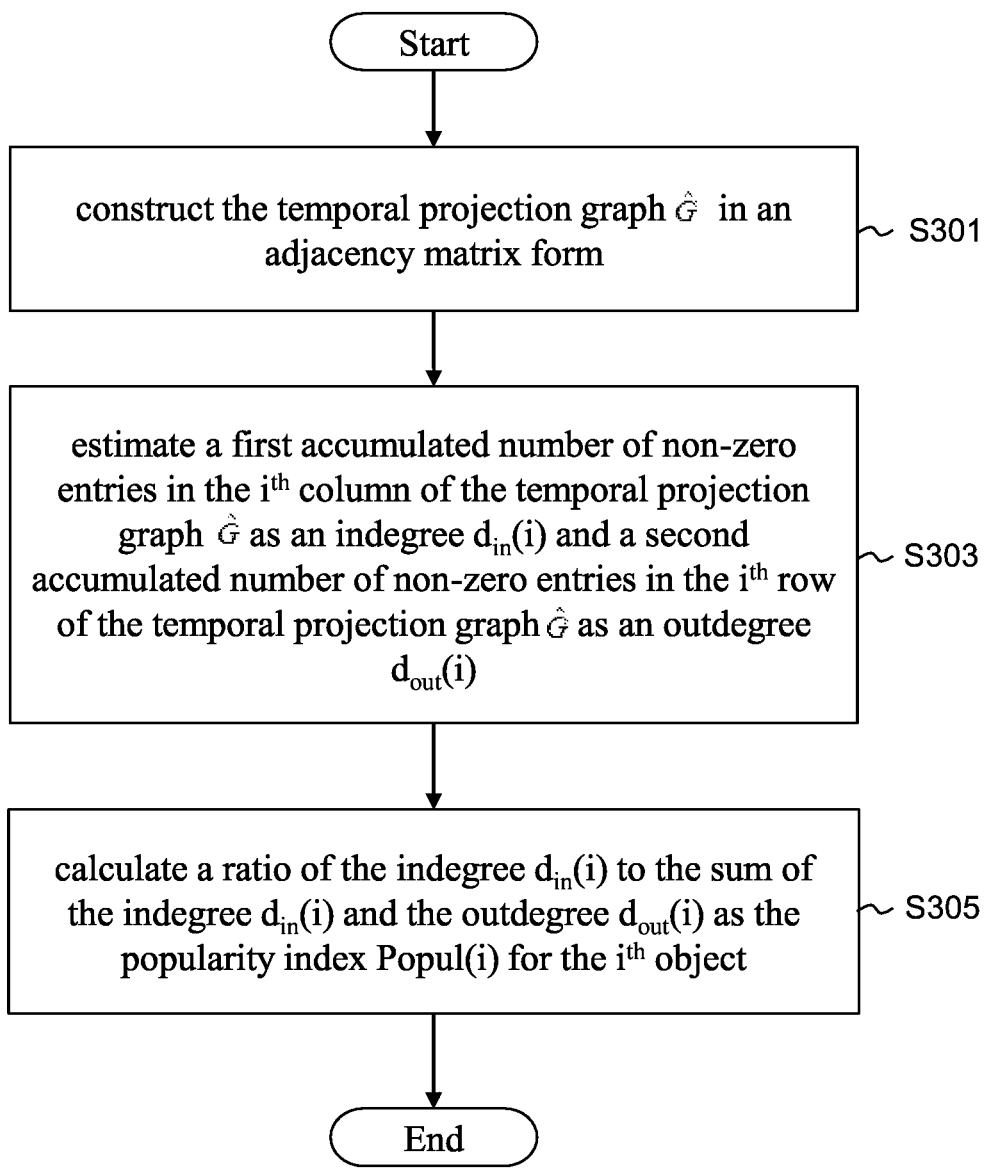
FIG. 3 illustrates a flow chart of a method of generating a popularity index for objects in accordance with one embodiment of the present disclosure.

FIG. 3 illustrates a flow chart of a method of generating a popularity index for objects in accordance with some embodiments of the present disclosure. According to the method of generating a popularity index for objects, first, the computer may construct the temporal projection graph $\hat{G}$ in an adjacency matrix form according to the above-mentioned embodiments (S301). Then, the computer may estimate a first accumulated number of non-zero entries in the $i^{th}$ column of the temporal projection graph $\hat{G}$ as an indegree $d_{in}(i)$ of the $i^{th}$ object $O_i$ and a second accumulated number of non-zero entries in the $i^{th}$ row of the temporal projection graph $\hat{G}$ as an outdegree $d_{out}(i)$ of the $i^{th}$ object $O_i$ (S303). Lastly, the computer may calculate a ratio of the indegree $d_{in}(i)$ to the sum of the indegree $d_{in}(i)$ and the outdegree $d_{out}(i)$ as the popularity index Popul(i) for the $i^{th}$ object $O_i$ (S305).

The popularity index Popul(i) for each of the objects $o_p$ may fall between 0 and 1. Moreover, if $d_{in}(i) \ll d_{out}(i)$, then Popul(i)$\rightarrow$1. For the $i^{th}$ object $O_i$ with a high popularity index Popul(i), one may infer that this object $O_i$ is popular recently because there are many users $U_n$ with links to other objects that have made transition to this object $O_i$. On the other hand, if $d_{in}(i) \gg d_{out}(i)$, then Popul(i)$\rightarrow$0. For the $i^{th}$ object $O_i$ with a low popularity index Popul(i), one may infer that this object $O_i$ was popular in the past and unpopular now because there are many users $U_n$ with links to this object $O_i$ that have made transition to other objects.

Figure 4:
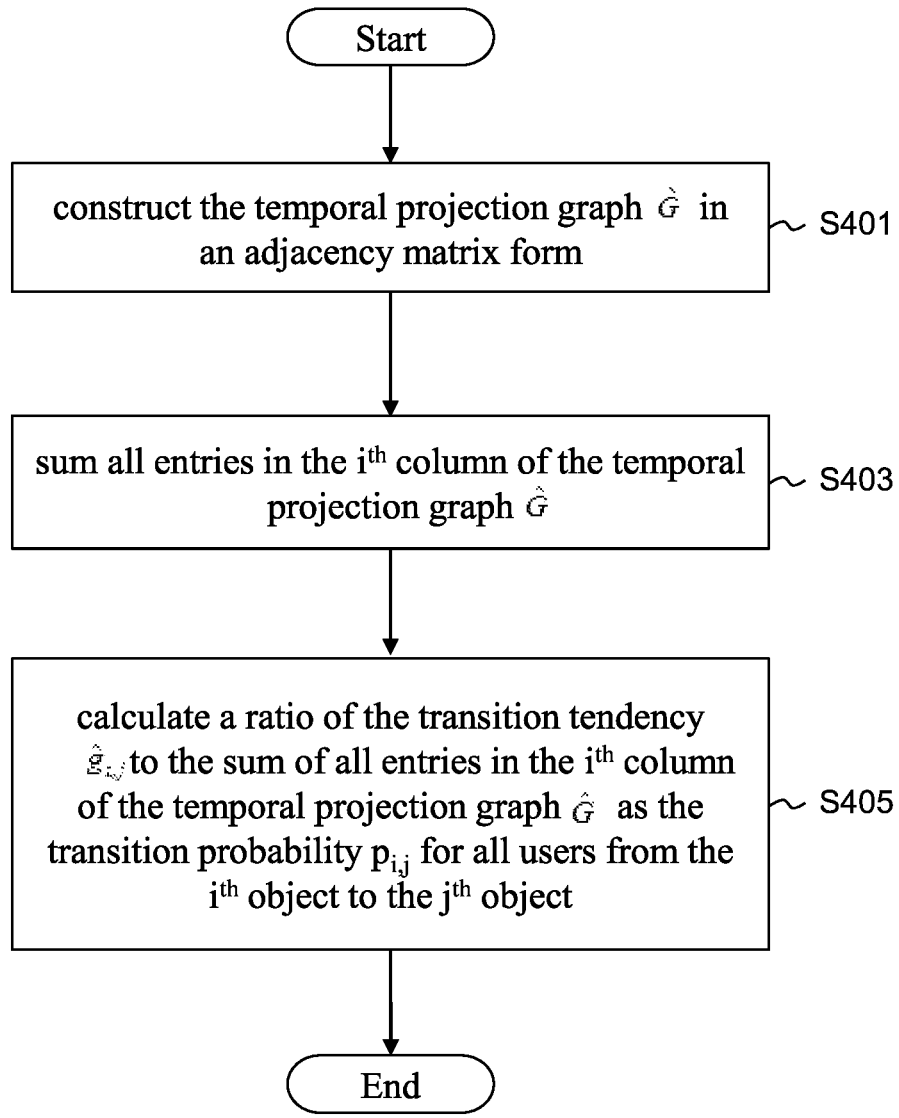
FIG. 4 illustrates a flow chart of a method of estimating a transition probability for objects in accordance with one embodiment of the present disclosure.

FIG. 4 illustrates a flow chart of a method of estimating a transition probability for objects in accordance with some embodiments of the present disclosure. The method of estimating a transition probability for objects comprises the steps as follows: First, the computer may construct the temporal projection graph $\hat{G}$ in an adjacency matrix form according to the above-mentioned embodiments (S401). Then, the computer may sum all entries in the $i^{th}$ column of the temporal projection graph $\hat{G}$ (S403). Lastly, the computer may calculate a ratio of the transition tendency $\hat{g}_{i,j}$ to the sum of all entries in the $i^{th}$ column of the temporal projection graph $\hat{G}$ as the transition probability $p_{i,j}$ for all users $U_k$ from the $i^{th}$ object $O_i$ to the $j^{th}$ object $O_j$ (S409).

Figure 5:
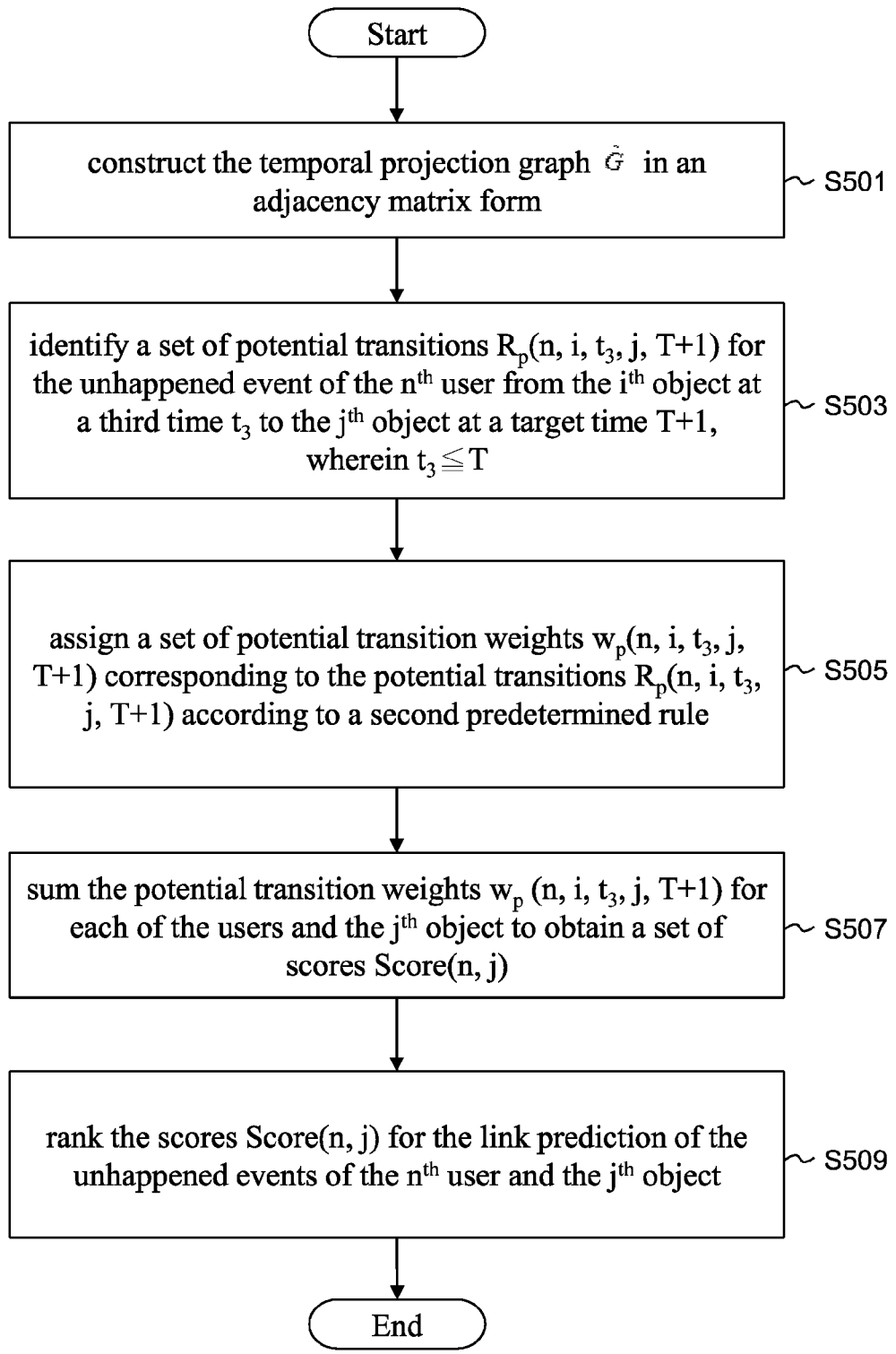
FIG. 5 illustrates a flow chart of a method of link prediction for an unhappened event in accordance with one embodiment of the present disclosure.

FIG. 5 illustrates a flow chart of a method of link prediction for an unhappened event in accordance with some embodiments of the present disclosure. First the computer may construct the temporal projection graph $\hat{G}$ in an adjacency matrix form according to the above-mentioned embodiments (S501). Then, the computer may identify a set of potential transitions $R_p(n, i, t_3, j, T+1)$ for the unhappened events of the users $U_k$ from the $i^{th}$ object $O_i$ at a third time $t_3$ to the $j^{th}$ object $O_j$ at a target (or future) time $T+1$, where $1 \leq n \leq N$, $1 \leq t_3 \leq T$, and $1 \leq i, j \leq M$.

Next, the computer may identify a set of potential transitions $R_p(n, i, t_3, j, T+1)$ for the unhappened events of the users $U_k$ from the $i^{th}$ object $O_i$ at a third time $t_3$ to the $j^{th}$ object $O_j$ at a target time $T+1$ (S503).

Next, the computer may assign a set of potential transition weights $w_p(n, i, t_3, j, T+1)$ corresponding to the potential transitions $R_p(n, i, t_3, j, T+1)$ according to a second predetermined rule (S505).

Next, the computer may sum the potential transition weights $w_p(n, i, t_3, j, T+1)$ for each of the users $U_k$ and the $j^{th}$ object $O_j$ to obtain a set of scores $$\text{Score}(n, j) = \sum_{t_3=1}^{T} \sum_{i=1}^{M} w_p(n, i, t_3, j, T+1). \tag{S507}$$

Lastly, the computer may rank the scores Score(n, j) of the link prediction for the unhappened events of the users $U_k$ and the $j^{th}$ object $O_j$ (S509).

In some embodiments, the second predetermined rule comprises that each of the potential transition weights $w_p(n, i, t_3, j, T+1)$ is increasing in the third time $t_3$ at which the potential transition $R_p(n, i, t_3, j, T+1)$ occurs. Similar to the first weighting factor $\alpha_1$, the computer may identify a fifth weighting factor $\alpha_5(t_3)$ for each of the potential transition weights $w_p(n, i, t_3, j, T+1)$ that is increasing in $t_3$.

In some embodiments, the second predetermined rule comprises that each of the potential transition weights $w_p(n, i, t_3, j, T+1)$ is increasing in the user-object weight $g_{n,i}^{t_5}$ between the $n^{th}$ user $U_n$ and the $i^{th}$ object $O_i$ at the third time $t_3$. Similar to the second weighting factor $\alpha_2$, the computer may identify a sixth weighting factor $\alpha_6(g_{n,i}^{t_5})$ for the potential transition weights $w_p(n, i, t_3, j, T+1)$ that is increasing in the user-object weight $g_{n,i}^{t_3}$.

In some embodiments, the second predetermined rule comprises that each of the potential transition weights $w_p(n, i, t_3, j, T+1)$ is decreasing in the duration $(T+1-t_3)$ of the potential transition $R_p(n, i, t_3, j, T+1)$. Similar to the third weighting factor $\alpha_3$, the computer may identify a seventh factor $\alpha_7(T+1-t_3)$ for the potential transition weights $w_p(n, i, t_3, j, T+1)$ that is decreasing in the duration $(T+1-t_3)$ of the potential transition $R_p(n, i, t_3, j, T+1)$.

In some embodiments, the second predetermined rule comprises each potential transition weight $w_p(n, i, t_3, j, T+1)$ is increasing in the transition probability $p_{i,j}$. For example, one potential transition $R_p$ with a larger transition probability from one object to the target object should carry a larger transition weight than that with a smaller transition probability from another object to the target object. Therefore, the computer may identify a eighth factor $\alpha_8(p_{i,j})$ for each of the potential transition weights $w_p(n, i, t_3, j, T+1)$ that is increasing in the transition probability $p_{i,j}$.

According to some embodiments of the present disclosure, the computer may use the simple product of these four weighting factors $\alpha_5, \alpha_6, \alpha_7, \alpha_8$ for each of the potential transition weights $w_p(n, i, t_3, j, T+1)$ to satisfy the following equation:

$$w_p(n,i,t_3,j,T+1) = \alpha_5(t_3) \times \alpha_6(g_{n,i}^{t_3}) \times \alpha_7(T+1-t_3) \times \alpha_8(p_{i,j}) \tag{7}$$

To simply calculations, the computer may assume that these four weighting factors $\alpha_5, \alpha_6, \alpha_7, \alpha_8$ satisfy the following equations:

$$\alpha_5(t_3) \times \alpha_7(T+1-t_3) = \alpha(t) \tag{8}$$

$$\alpha_6(g_{n,i}^{t_3}) = g_{n,i}^{t_3} \tag{9}$$

$$\alpha_8(p_{i,j}) = p_{i,j} \tag{10}$$

The potential transition weights $w_p(n, i, t_3, j, T+1)$ may further satisfy the following equation:

$$w_p(n,i,t_3,j,T+1) = \alpha(t) \times g_{n,i}^{t_3} \times p_{i,j} \tag{11}$$

The scores $$\text{Score}(n, j) = \sum_{t_3=1}^{T} \sum_{i=1}^{M} w_p(n, i, t_3, j, T+1)$$

may satisfy the following equation:

$$\text{Score}(n, j) = \sum_{t_3=1}^{T} \sum_{i=1}^{M} \alpha(t) \times \delta_{n,i}^{t_3} \times p_{i,j} \tag{12}$$

One of ordinary skill in the art having the benefit of the present disclosure would appreciate that the transition probability $p_{i,j}$ may be stored in the memory of the computer in advance. In some embodiments, the computer may assume that $\alpha(t) = (0.8)^{T-t}$. Thus the scores Score(n, j) for all users $U_k$ may be calculated as following equations:

$$\text{Score}(1,1) = \alpha(1) \times p_{1,1} \cong 0.24 \tag{13}$$

$$\text{Score}(1,2) = \alpha(1) \times g_{1,1}^{1} \times p_{1,2} + \alpha(1) \times g_{1,2}^{1} \times p_{2,2} + \alpha(2) \times g_{1,2}^{2} \times p_{2,2} + \alpha(3) \times g_{1,2}^{3} \times p_{2,2} \cong 1.87 \tag{14}$$

$$\text{Score}(1,3) = \alpha(1) \times g_{1,1}^{1} \times p_{1,3} + \alpha(1) \times g_{1,2}^{1} \times p_{2,3} + \alpha(2) \times g_{1,2}^{2} \times p_{2,3} + \alpha(3) \times g_{1,2}^{3} \times p_{2,3} \cong 1.78 \tag{15}$$

$$\text{Score}(2,1) = \alpha(1) \times g_{2,1}^{1} \times p_{1,1} + \alpha(3) \times g_{2,1}^{3} \times p_{1,1} \cong 0.84 \tag{16}$$

$$\text{Score}(2,2) = \alpha(1) \times g_{2,1}^{1} \times p_{1,2} + \alpha(3) \times g_{2,1}^{3} \times p_{1,2} \cong 0.41 \tag{17}$$

$$\text{Score}(2,3) = \alpha(1) \times g_{2,1}^{1} \times p_{1,3} + \alpha(3) \times g_{2,1}^{3} \times p_{1,3} \cong 1.03 \tag{18}$$

Accordingly, the computer may sort the numerical results to rank these user-object pairs for link prediction. The results indicate that the pair of the first user $U_1$ and the second object $O_2$ has the highest score.

The present disclosure may advantageously improve the ability to provide a method of temporal bipartite projection for users and objects to obtain the temporal projection graph that represents a set of transition tendencies among objects over time. Based on the temporal projection graph, the popularity index of objects for ranking objects and the transition probability between two objects are obtained. Additionally, the score for temporal prediction may rank the likelihood of the occurrence of a future link between a user and an object.

Realizations in accordance with the present disclosure have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the disclosure as defined in the claims that follow.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Field of Disclosure," the claims should not be limited by the language chosen under this heading to describe the so-called field. Further, a description of a technology in the "Background of the Disclosure" is not to be construed as an admission that certain technology is prior art to any embodiment(s) in this disclosure. Neither is the "Summary of the Disclosure" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method of obtaining a link prediction for an unhappened event occurring in a bipartite network of users and objects, comprising:

receiving, at a computer, a user-object dataset, wherein the user-object dataset comprises a set of users, a set of objects, a set of times for which the events between the users and the objects occur;

generating, at the computer, a sequence of user-object weighted bipartite networks $\{G^t, t=1, T\}$ with a set of user-object weights $g_{n,m}^{\ t}$ between each pair of an $n^{th}$ user and a $m^{th}$ object at a time t by data processing the user-object dataset;

identifying at the computer a set of transitions $R(n, i, t_1, j, t_2)$ for the $n^{th}$ user from an $i^{th}$ object at a first time $t_1$ to a $j^{th}$ object at a second time $t_2$ according to the user-object weighted bipartite networks $G^t$ wherein $t_2 > t_1$;

assigning, at the computer, a set of transition weights $w(n, i, t_1, i, t_2)$ corresponding to the transitions $R(n, i, t_1, j, t_2)$ according to a first predetermined rule;

summing at the computer the transition weights $w(n, i, t_1, j, t_2)$ for all users to obtain a set of transition tendencies $\hat{g}_{i,j}$ from the $i^{th}$ object and the $i^{th}$ object;

constructing, at the computer, a temporal projection graph $\hat{G}$ for all objects with the transition tendencies $\hat{g}_{i,j}$ in an adjacency matrix form;

wherein, the temporal projection graph $\hat{G}$ represents transition tendencies between any two objects in the bipartite network and self-transition tendencies of any one objects in the bipartite network for obtaining the temporal information of the bipartite network of the users and the objects;

identifying, at the computer, a set of potential transitions $R_p(n, i, t_3, j, T+1)$ for the unhappened events of the $n^{th}$ user from the $i^{th}$ object at a third time $t_3$ to the $j^{th}$ object at a target time T+1, wherein $1 \leq t_3 \leq T$;

assigning, at the computer, a set of potential transition weights $w_p(n, i, t_3, j, T+1)$ corresponding to the potential transitions $R_p(n, i, t_3, j, T+1)$ according to a second predetermined rule;

summing, at the computer, the potential transition weights $w_p(n, i, t_3, j, T+1)$ for the $n^{th}$ user and the $j^{th}$ object to obtain a set of scores Score(n, j); and ranking, at the computer, the scores Score(n, j) for obtaining the link prediction of the unhappened events of the $n^{th}$ user and the $j^{th}$ object.

2. The method of link prediction for an unhappened event according to claim 1, wherein the second predetermined rule comprises each of the potential transition weights $w_p(n, i, t_3, j, T+1)$ is increasing in the third time $t_3$ at which the potential transition $R_p(n, i, t_3, j, T+1)$ occurs.

3. The method of link prediction for an unhappened event according to claim 1, wherein the second predetermined rule comprises that each of the potential transition weights $w_p(n, i, t_3, j, T+1)$ is increasing in the user-object weight $g_{n,i}^{\ t_3}$ between the $n^{th}$ user and the $i^{th}$ object at the third time $t_3$.

4. The method of link prediction for an unhappened event according to claim 1, wherein the second predetermined rule comprises that each of the potential transition weights $w_p(n, i, t_3, j, T+1)$ is decreasing in the duration $(T+1-t_3)$ of the potential transition $R_p(n, i, t_3, j, T+1)$.

5. The method of link prediction for an unhappened event according to claim 1, further comprising summing, at the computer, all entries in the $i^{th}$ column of the temporal projection graph $\hat{G}$, and calculating, at the computer, a ratio of the transition tendency $\hat{g}_{i,j}$ to the sum of all entries in the $i^{th}$ column of the temporal projection graph $\hat{G}$ as a transition probability $p_{i,j}$ from the $i^{th}$ object to the $j^{th}$ object.

6. The method of link prediction for an unhappened event according to claim 5, wherein the second predetermined rule comprises that each of the transition weights $w_p(n, i, t_3, j, T+1)$ is increasing in the transition probability $p_{i,j}$.

7. The method of link prediction for an unhappened event according to claim 1, wherein the predetermined rule comprises that each of the transition weights $w(n, i, t_1, j, t_2)$ is increasing in the first time $t_1$ at which the transition $R(n, t_1, j, t_2)$ occurs.

8. The method of link prediction for an unhappened event according to claim 1, wherein the predetermined rule comprises that each of the transition weights $w(n, i, t_1, j, t_2)$ is increasing in the user-object weight $g_{n,i}^{\ t_1}$ between the $n^{th}$ user and the $i^{th}$ object at the first time $t_1$.

9. The method of link prediction for an unhappened event according to claim 1, wherein the predetermined rule comprises that each of the transition weights $w(n, i, t_1, j, t_2)$ is decreasing in the duration $(t_2 - t_1)$ of the transition $R(n, t_1, j, t_2)$.

10. The method of link prediction for an unhappened event according to claim 1, wherein the predetermined rule comprises that the transition $R(n, i, t_1, j, t_2)$ for the $n^{th}$ user should be normalized.

11. The method of link prediction for an unhappened event according to claim 1, wherein each of the transition weights $w(n, i, t_1, j, t_2)$ is determined by the equation: $w(n, i, t_1, j, t_2) = \alpha_1(t_1) \times \alpha_2(g_{n,i}^{t_1}) \times \alpha_3(t_2-t_1) \times \alpha_4(n,t_1)$, wherein $\alpha_1, \alpha_2, \alpha_3, \alpha_4$ are weighting factors,
- wherein $\alpha_1$ is increasing in the first time $t_1$ at which the transition $R(n, i, t_1, j, t_2)$ occurs;
- $\alpha_2$ is increasing in the user-object weight $g_{n,i}^{t_1}$ between the $n^{th}$ user and the $i^{th}$ object at the first time $t_1$;
- $\alpha_3$ is decreasing in the duration $(t_2-t_1)$ of the transition $R(n, i, t_1, j, t_2)$; and
- $\alpha_4$ is related to normalize each of the transitions $R(n, i, t_1, j, t_2)$.

\* \* \* \* \*